(12) United States Patent
Schaffitzel (10) Patent No.: US 9,463,594 B2
(45) Date of Patent: Oct. 11, 2016

(54) METHOD AND APPARATUS FOR CORRUGATING FILTER MEDIA

(71) Applicant: Braden Manufacturing, LLC, Tulsa, OK (US)

(72) Inventor: Mark D. Schaffitzel, Owasso, OK (US)

(73) Assignee: Braden Manufacturing, LLC, Tulsa, OK (US)

( * ) Notice: Subject to any disclaimer, the term of this patent is extended or adjusted under 35 U.S.C. 154(b) by 155 days.

(21) Appl. No.: 14/209,411

(22) Filed: Mar. 13, 2014

(65) Prior Publication Data

US 2014/0265009 A1    Sep. 18, 2014

Related U.S. Application Data (60) Provisional application No. 61/779,176, filed on Mar. 13, 2013.

(51) Int. Cl.

| | |
|---|---|
| *B29C 43/46* | (2006.01) |
| *B29C 53/26* | (2006.01) |
| *B29C 43/22* | (2006.01) |
| *B01D 46/00* | (2006.01) |
| *B29C 53/28* | (2006.01) |
| *B29C 53/24* | (2006.01) |
| *B29C 53/36* | (2006.01) |
| *B29C 53/22* | (2006.01) |
| *B01D 46/52* | (2006.01) |
| *B29L 31/14* | (2006.01) |

(52) U.S. Cl.
CPC ........... *B29C 53/265* (2013.01); *B29C 43/226* (2013.01); *B01D 46/0001* (2013.01); *B01D 46/522* (2013.01); *B29C 43/46* (2013.01); *B29C 53/22* (2013.01); *B29C 53/24* (2013.01); *B29C 53/28* (2013.01); *B29C 53/36* (2013.01); *B29C 2043/463* (2013.01); *B29L 2031/14* (2013.01)

(58) Field of Classification Search
CPC .............. B29C 43/226; B29C 53/265; B29C 2043/463; B29C 53/22; B29C 53/24; B29C 53/36; B29C 53/28; B29C 53/285; B29C 43/46; B01D 41/0001; B01D 46/522; B29L 2031/14
See application file for complete search history.

(56) References Cited

U.S. PATENT DOCUMENTS

| | | | |
|---|---|---|---|
| 4,882,005 A * | 11/1989 | Thompson ............ | B05C 1/0808 118/212 |
| 6,623,587 B1 * | 9/2003 | Muller .............. | A61F 13/15699 156/178 |
| 7,927,540 B2 | 4/2011 | Smithies et al. | |
| 7,942,948 B2 | 5/2011 | Smithies et al. | |
| 8,197,569 B2 | 6/2012 | Healey et al. | |

(Continued)

*Primary Examiner* — Jeffrey Wollschlager
(74) *Attorney, Agent, or Firm* — Senniger Powers LLP (57) ABSTRACT

An apparatus for corrugating filter media includes upstream and downstream rollers. The upstream roller has an exterior surface including a corrugation pattern defining a plurality of circumferential channels. A heating source heats the filter media so that the filter media is within its elastic temperature range when the filter media engages the upstream roller. A motor drives rotation of the upstream and downstream rollers. A controller controls the motor so that the downstream roller rotates at a rotational speed greater than the upstream roller to impart tension to the filter media at the upstream roller. The heated filter media at least partially enters the channels of the corrugating pattern on the upstream roller to form corrugations on the filter media. A method of forming corrugations on filter media may be performed using the apparatus.

12 Claims, 9 Drawing Sheets

(56) References Cited

U.S. PATENT DOCUMENTS

| | | |
|---|---|---|
| 8,202,340 B2 | 6/2012 | Healey et al. |
| 8,257,459 B2 | 9/2012 | Healey et al. |
| 8,262,780 B2 | 9/2012 | Smithies et al. |
| 8,945,452 B2 * | 2/2015 | Morita ............... D04H 1/56 264/175 |
| 2004/0091563 A1 * | 5/2004 | Saito ................. B29C 43/46 425/363 |
| 2005/0067732 A1 | 3/2005 | Kim et al. |
| 2005/0113235 A1 * | 5/2005 | Basily ............... B31D 3/002 493/463 |
| 2006/0083893 A1 * | 4/2006 | Ashraf ............. A61F 13/4902 428/131 |
| 2006/0151383 A1 * | 7/2006 | Choi ............... B01D 46/0001 210/493.1 |
| 2006/0151914 A1 * | 7/2006 | Gerndt ............... B29C 55/065 264/288.4 |
| 2007/0273077 A1 * | 11/2007 | Kling ................. B31D 3/002 270/41 |
| 2008/0217241 A1 | 9/2008 | Smithies et al. |
| 2008/0314010 A1 | 12/2008 | Smithies et al. |
| 2008/0315465 A1 | 12/2008 | Smithies et al. |
| 2009/0071114 A1 * | 3/2009 | Smithies ........... B01D 39/163 55/521 |
| 2010/0065984 A1 * | 3/2010 | Akaki ................. B29C 55/18 264/288.4 |
| 2010/0145295 A1 * | 6/2010 | Isele ............... A61F 13/15731 604/365 |
| 2011/0162337 A1 | 7/2011 | Healey et al. |
| 2012/0196733 A1 | 8/2012 | Moe et al. |

* cited by examiner

METHOD AND APPARATUS FOR CORRUGATING FILTER MEDIA

FIELD OF THE INVENTION

The present invention generally relates to a method and apparatus for corrugating filter media.

BACKGROUND

In some fields and/or circumstances, corrugated filter media, such as corrugated air filter media, is preferred over flat media. For example, it is generally preferable for air filters for gas turbines to include corrugated filter media. The corrugated media include corrugations having outer ridges, which will face the direction of the air flow in use, uniformly spaced apart from outer ridges of adjacent corrugations to define a pitch of the corrugated media. Each pair of adjacent corrugations defines a groove therebetween having an effective depth extending from the outer ridges to a floor of the groove. The effective depth of the grooves between adjacent corrugations is a parameter that determines whether corrugations will collapse under high static pressure from high air velocities and dust loadings. A known method of corrugating filter media is to pass the media through opposing heated rollers that have meshing teeth for forming the corrugations.

BRIEF DESCRIPTION OF THE DRAWINGS

Corresponding reference characters indicate corresponding parts throughout the drawings.

DETAILED DESCRIPTION OF THE DRAWINGS

Figure 1:
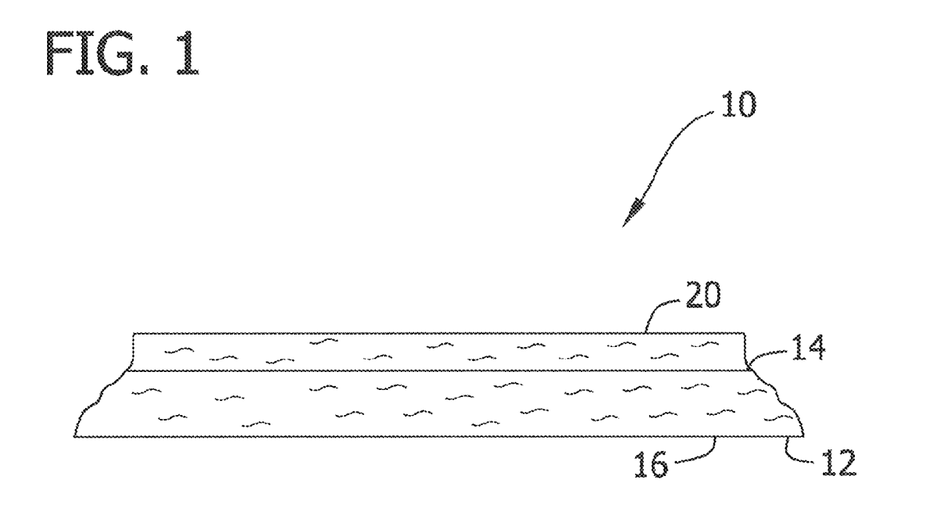
FIG. 1 is a fragmentary cross section of composite filter media.

The present disclosure describes a method and apparatus for corrugating filter media, and in one exemplary embodiment, a method and apparatus for corrugating air filter media that is used in an air filter element or cartridge of a gas turbine. Referring to FIG. 1, suitable filter media for corrugating according to the teachings of the present disclosure is generally indicated at reference numeral 10. In this non-limiting example, the filter media 10 includes a base media substrate 12 having a first side 14 and a second side 16. In this non-limiting example, a nanofiber layer 20 is deposited onto the first side 14 (or the second side 16, or both sides) of the media substrate 12. In another example, the base media substrate 12 does not include a nanofiber layer.

Figure 2:
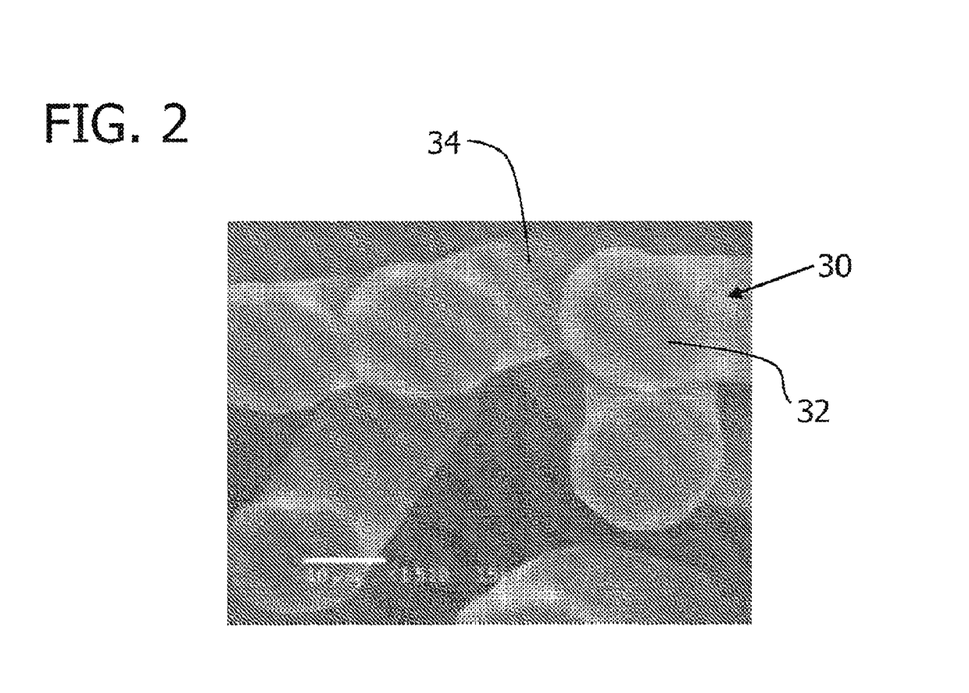
FIG. 2 is a photomicrograph of bicomponent fibers used in the filter media of FIG. 1.

In general, the base media substrate 12 may be a nonwoven fabric comprising a polymer, and in one example, a thermoplastic polymer (e.g., polyethylene, polyvinylchloride, polypropylene, polystyrene, and/or nylon), and in another example, a thermosetting polymer (e.g., polyesters, polyurethanes, and/or polyimides). In the illustrated example, the media substrate 12 may be a nonwoven fabric formed from synthetic bicomponent fibers using, for example, a spunbond process. Suitable bicomponent fibers are fibers having a core-sheath structure, an island structure or a side-by-side structure. Referring to FIG. 2, in the exemplary embodiment, a bicomponent fiber 30 includes a core 32 and a sheath 34 circumferentially surrounding core 32. In one example, the bicomponent fibers 30 are meltspun through jets into a plurality of continuous fibers which are uniformly deposited into a random three dimensional web to form the base media substrate 12.

In the illustrated embodiment, the bicomponent fibers 30 of the nonwoven fabric of media substrate 12 may be any suitable bicomponent fiber. Suitable materials for the core 32 of the bicomponent fibers 30 include, but are not limited to, polyester, polyamid, polyolefin, thermoplastic polyurethane, polyetherimide, polyphenyl ether, polyphenylene sulfide, polysulfone, aramid, and mixtures thereof. Suitable materials for the sheath 34 of the bicomponent fiber include thermoplastic materials that have a lower melting point than the material of the core of the bi-component fiber, for example polyester, polyamid, polyolefin, thermoplastic polyurethane, polyetherimide, polyphenyl ether, polyphenylene sulfide, polysulfone, aramid, and mixtures thereof. The bicomponent fibers 30 have diameter of about 12 microns to about 18 microns.

The nanofiber layer 20 may be formed by an electro-blown spinning process that includes feeding a polymer solution into a spinning nozzle, applying a high voltage to the spinning nozzle, and discharging the polymer solution through the spinning nozzle while injecting compressed into the lower end of the spinning nozzle. A suitable electro-blown spinning process of forming nanofibers and the apparatus used is described in detail in U.S. Patent Application Publication No. 2005/0067732, the relevant portions of which are hereby incorporated by reference. This exemplary electro-blown spinning process provides a durable three dimensional filtration layer of nanofibers that is thicker than other nanofiber filtration layers on known filter media. In the exemplary aspect the basis weight of nanofiber membrane layer 20 is about 0.6 g/m2 to about 20 g/m2, in another aspect, about 5 g/m2 to about 10 g/m2. The nanofibers in nanofiber layer 20 may have an average diameter of about 500 nm or less.

Media substrate 12 has a high air permeability compared to some other filter media, which permits improved mechanical adhesion of the nanofibers to the media substrate 12, as described below. As nanofiber layer 20 is applied to the first side 14 of the media substrate 12, a vacuum may be applied from the second side 16 of the media substrate during the electro-blown spinning process to hold the nanofibers on the substrate. In combination with the drying temperatures used in the application of nanofiber layer 12, softening of the sheath portion 34 of the bicomponent fiber 30 occurs and the nanofiber layer 20 is further densified and bonded to the spunbond base media substrate 12.

Suitable polymers for forming nanofibers by the electro-blown spinning process are not restricted to thermoplastic polymers, and may include thermosetting polymers. Suitable polymers include, but are not limited to, polyimides, polyamides (nylon), polyaramides, polybenzimidazoles, polyetherimides, polyacrylonitriles, polyethylene terephthalate, polypropylene, polyanilines, polyethylene oxides, polyethylene naphthalates, polybutylene terephthalate, styrene butadiene rubber, polystyrene, polyvinyl chloride, polyvinyl alcohol, polyvinylidene chloride, polyvinyl butylene and copolymer or derivative compounds thereof. The polymer solution is prepared by selecting a solvent that dissolves the selected polymers. The polymer solution can be mixed with additives, for example, plasticizers, ultraviolet ray stabilizers, crosslink agents, curing agents, reaction initiators, and the like. Although dissolving the polymers may not require any specific temperature ranges, heating may be needed for assisting the dissolution reaction.

Plasticizers may be added to the various polymers described above, in order to reduce the Tg of the fiber polymer. Suitable plasticizers will depend upon the polymer, as well as upon the particular end use of the nanofiber layer. For example, nylon polymers can be plasticized with water or even residual solvent remaining from the electrospinning or electro-blown spinning process. Other plasticizers which can be useful in lowering polymer Tg include, but are not limited to, aliphatic glycols, aromatic sulphanomides, phthalate esters, including but not limited to, dibutyl phthalate, dihexl phthalate, dicyclohexyl phthalate, dioctyl phthalate, diisodecyl phthalate, diundecyl phthalate, didodecanyl phthalate, and diphenyl phthalate, and the like.

A suitable filter media for use in the corrugating method of the present disclosure is product no. POA75V3VA (Substrate: 180 gsm bi component PET; Raw Material: PVDF), commercially available from FINETEX TECHNOLOGY (Cavite, Philippines). A data sheet for this filter media is below in Table 1.

| Physical Property | Value | Unit | Test Method |
| --- | --- | --- | --- |
| Basic Weight TOTAL | 113.7 185.0 | lbs/3000 ft$^2$ g/m$^2$ | BS ISO 536 |
| Basic Weight MEMBRANE | — — | lbs/3000 ft$^2$ g/m$^2$ | BS ISO 536 |
| Thickness | 0.021 0.53 | inches mm | ISO 534 BS 3983 |
| Air Permeability @125 Pa | 42.1 | CFM | ASTM D737-96(Frazier) |
| Air Flow Resistance @5.33 cm/s, 32 L/min | 3.61 35.4 | mmH$_2$O Pa | ASTM D 2986 |
| DOP Pentration 0.3 μm@5.33 cm/s | 24.5 75.5 (Efficiency) | % | ASTM D 2986 |

In other non-limiting examples, the filter media 10 may be a membrane composite, among other types of filter media. The membrane composite comprises microporous membranes that are composed of ultra-high molecular weight polyethylene, and possess a structure consisting of a microfibrillar, laminar membrane network.

Figure 3:
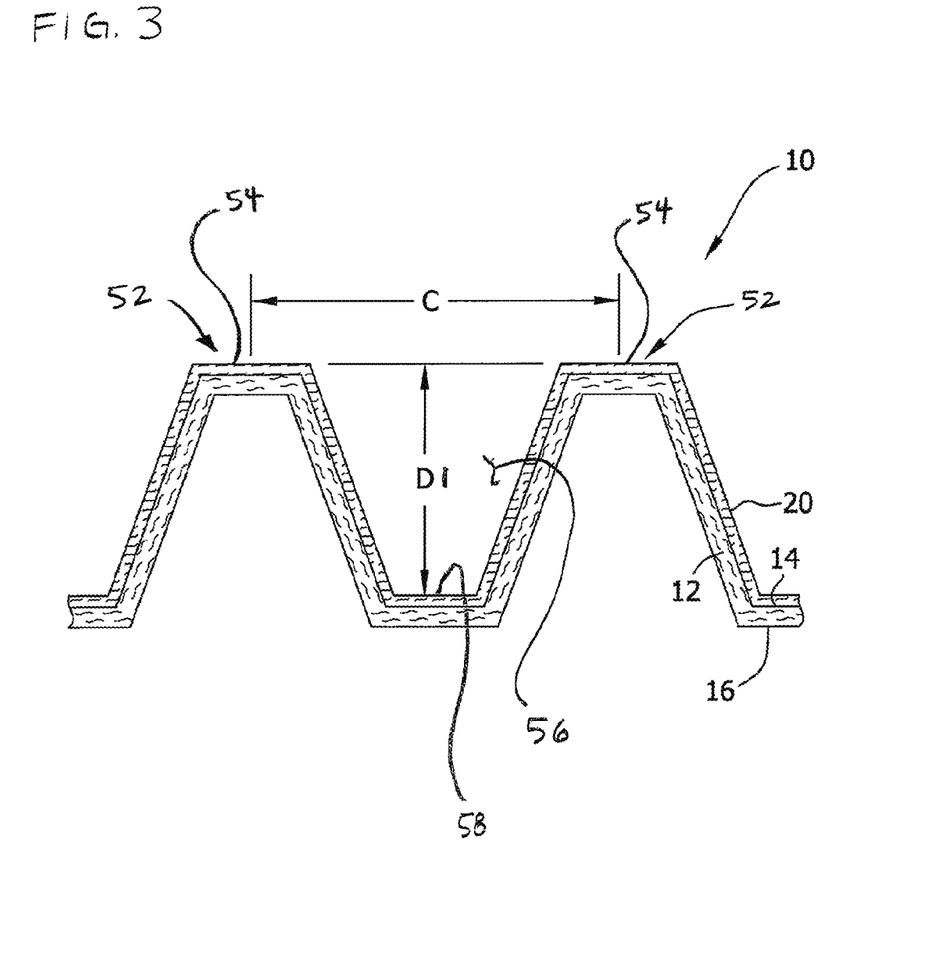
FIG. 3 is a fragmentary cross section of corrugated filter media produced using an embodiment of a corrugating method and apparatus.

Referring to FIG. 3, the below described corrugating method and apparatus shapes or forms the filter media into a plurality of corrugations or pleats, generally indicated at 52. In the non-limiting example, the corrugations 52 are formed as alternating up and down, truncated triangle-shape waves in the filter media 10. Each corrugation 52 comprises an outer ridge 54 spaced apart from the outer ridges of adjacent corrugations to define a groove 56 between each pair of adjacent corrugations. Adjacent corrugations 52 are connected to one another at a floor 58 of the groove 56, which defines a juncture or bridge between adjacent corrugations. Each groove 56 has an effective depth D1, which may measure from least about 0.002 in (0.0508 mm) to about 0.050 in (1.27 mm) to permit breathability of the corrugated filter media 10 at high dust loading to maintain low differential pressure, e.g., below about 4 inches water column (wc). As explained below, the apparatus and method for corrugating the filter media 10 allows the effective depth D1 to be changed by adjusting operating parameters of the method and apparatus. A corrugation pitch C in the exemplary aspect is about 3 to about 10 corrugations per inch (about 1.2 to about 3.9 corrugations per cm), and in another example, from about 3 to about 6 corrugations per inch (about 1.2 to about 2.4 corrugations per cm). The combination of effective groove depth D1 and corrugation pitch C permit optimization of touch points which inhibits corrugation collapse under high static pressure from high air velocities and dust loadings. In other embodiments, the apparatus and method may be configured to form corrugations 52 having a substantially triangle-shape (i.e., non-truncated), or a substantially sinusoidal shape, or a generally square-wave shape, or generally sawtooth shapes, among other shapes that do not depart from the scope of the present disclosure.

Figure 4:
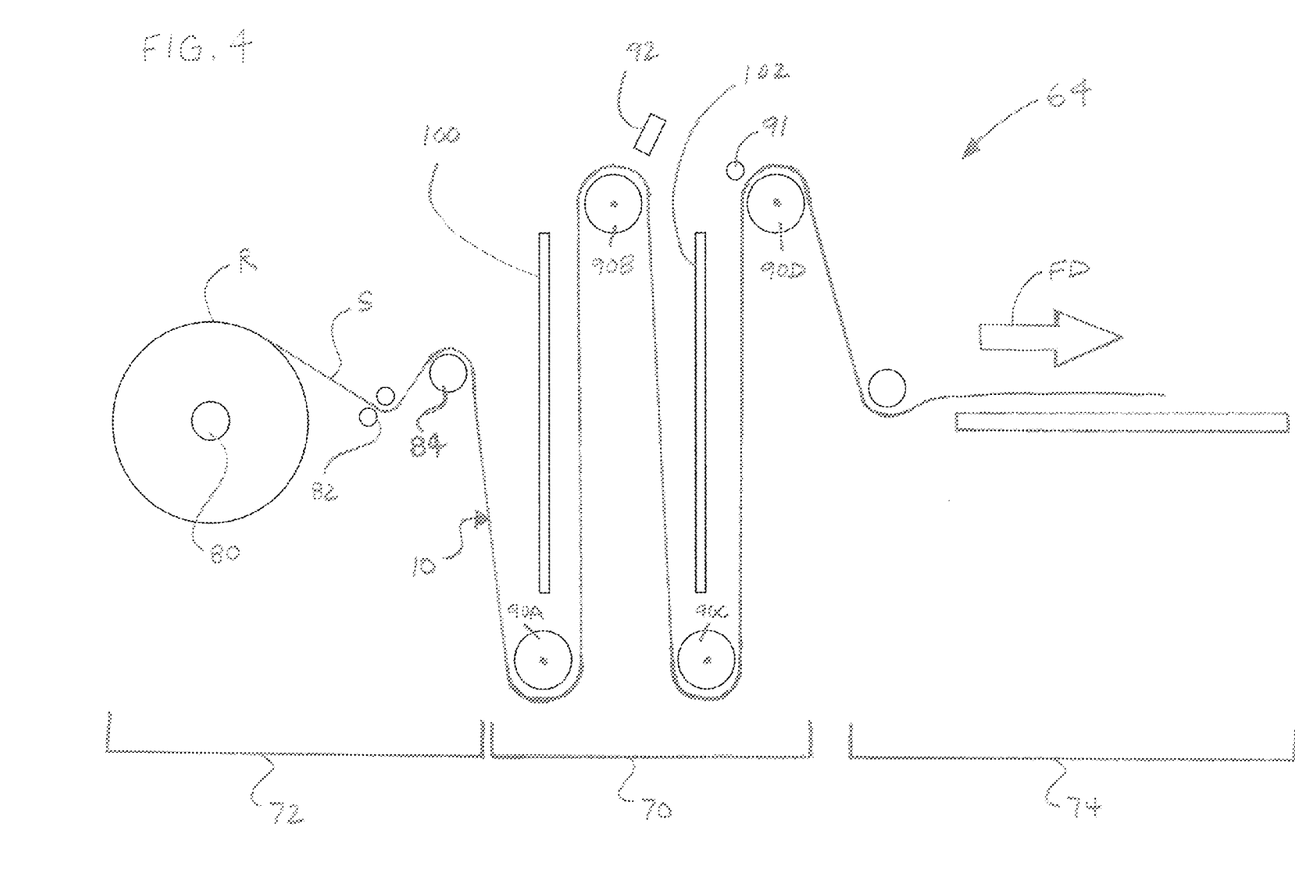
FIG. 4 is a schematic of one embodiment of a corrugating apparatus for corrugating filter media.
Figure 5:
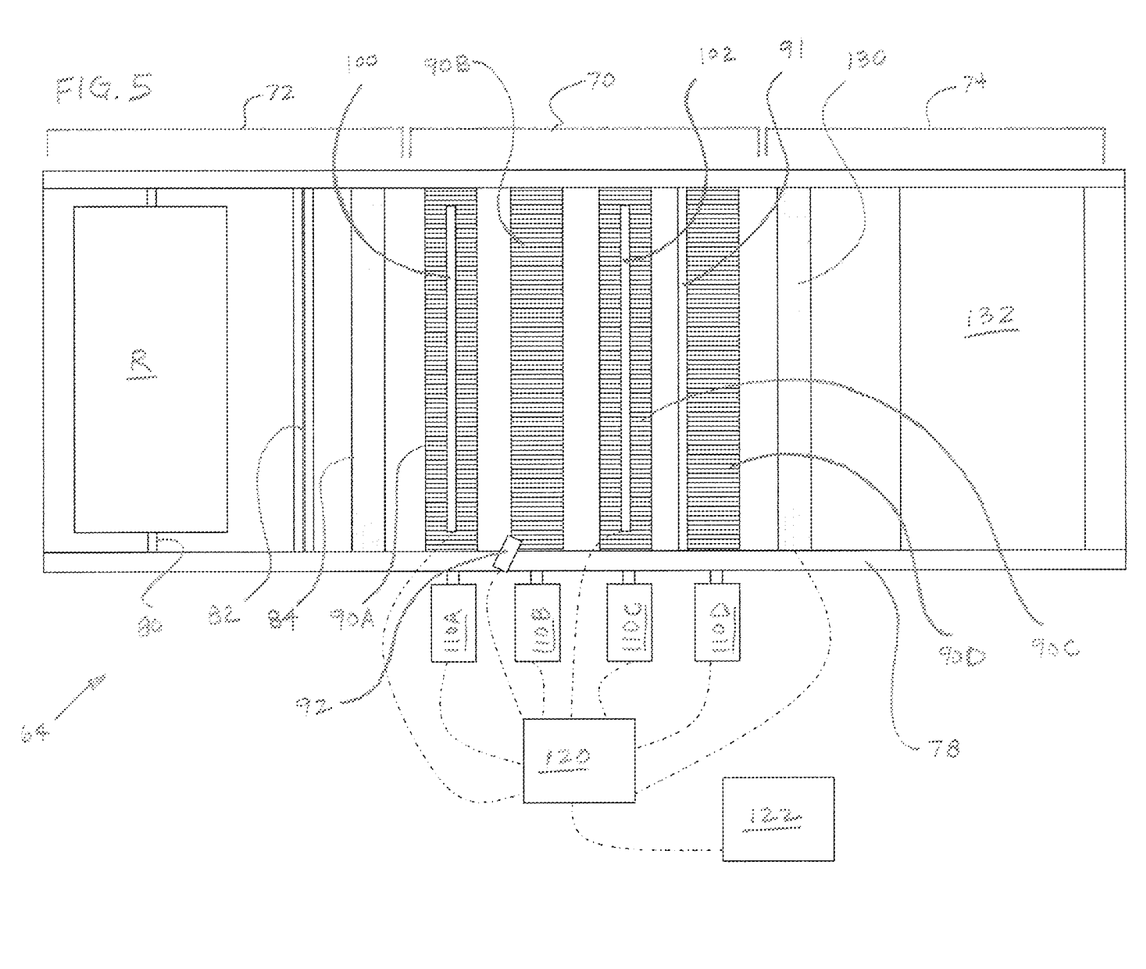
FIG. 5 is a top schematic view of the corrugating apparatus.

Referring to FIGS. 4 and 5, a corrugation apparatus according to one embodiment of the present disclosure is generally indicated at reference numeral 64. The corrugation apparatus 64 includes a corrugating mechanism 70, which forms corrugations in the filter media 10; a feeding mechanism 72 for feeding non-corrugated filter media 10 to the corrugating mechanism; and a receiving mechanism 74 for receiving the corrugated filter media from the corrugating mechanism. Each of the mechanisms 70, 72, 74 is connected to rigid framing 78 of the apparatus 64. In general, the filter media 10 is delivered or fed through the mechanisms 70, 72, 74 along a feed path in a feed direction FD.

In the illustrated embodiment, the feeding mechanism 72 includes a holder 80 for holding a roll R of the non-corrugated filter media 10, and feeder nip and roller 82, 84, respectively. The roll R of filter media 10 is allowed to freely rotate relative to the framing 78 so that the filter media unwinds into a sheet S of filter media 10 as the media travels (e.g., is pulled through the apparatus 64. The feeding mechanism 72 may be of other configurations for delivering a sheet of the non-corrugated filter media 10 to the corrugating mechanism 70.

Figure 6:
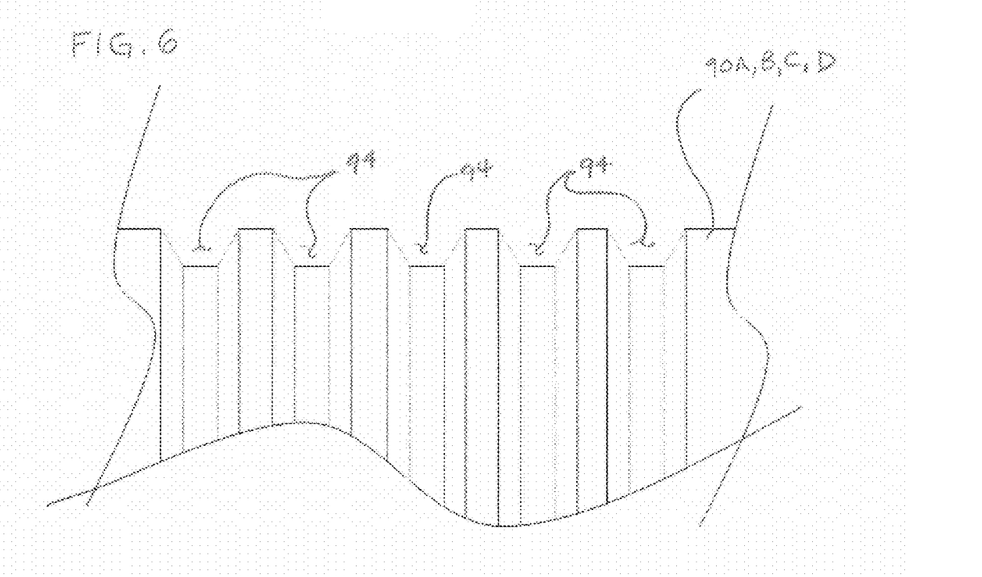
FIG. 6 is an enlarged, fragmentary front side elevational view of one of a plurality of corrugating rollers of the corrugating apparatus.
Figure 7:
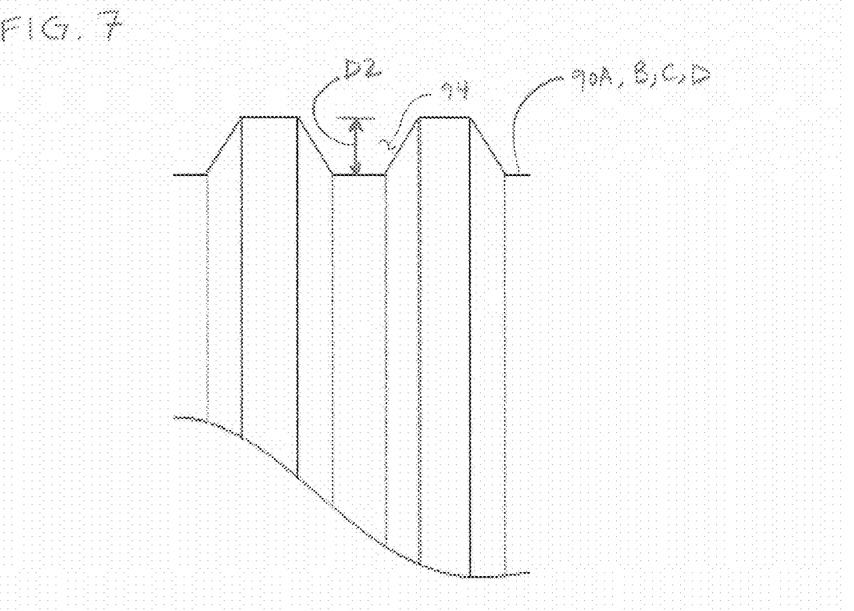
FIG. 7 is an enlarged, fragmentary view of FIG. 6.

In the illustrated embodiment, the corrugating mechanism 70 includes four in-line, corrugating rollers 90A, 90B, 90C, and 90D which are spaced apart from one another along the feed direction FD of the corrugation apparatus 64. A pinch roller 91 is associated with the corrugating roller 90D that is farthest downstream. The corrugating rollers 90A and 90C are lower rollers, and the corrugating rollers 90B, 90D are upper rollers. In other embodiments, the corrugating mechanism may include more than four corrugating rollers or less than four corrugating rollers, such as two corrugating rollers. In the embodiment illustrated in FIGS. 4 and 5, the corrugating rollers 90A-90C have identical corrugation patterns on exterior surface of the rollers. In particular, with reference to FIGS. 6 and 7, the corrugation pattern of each roller 90A-90C includes a plurality of circumferential channels 94 spaced apart from one another along a length of the roller. Each circumferential channel 94 may extend around an entire circumference of the corresponding roller 90A-90C, or some or all of the channels may extend around a portion of the circumference of the roller. In the illustrated embodiment, the channels 94 extend radially inward from the exterior surface of the corresponding roller 90A-90C. In another embodiment, radial projections extending radially outward from the exterior surface of the roller 90B, 90C may define the channels 94. In the illustrated embodiment, each channel 94 on each roller 90A-90D is aligned with a corresponding channel on each of the other rollers along the feed direction FD. The illustrated channels 94 have a truncated, triangle-shape, and in other embodiments the channels may have a triangle-shaped profile, an inverted U-shaped profile, or some other suitable profile shape. Referring to FIG. 7, in one embodiment each channel 94 may have a depth D2 from about 0.002 in (0.0508 mm) to about 0.250 in (6.35 mm)

It is understood that one or more of the other rollers 90A-90C of the corrugating mechanism 70 may not include a corrugation pattern, although at least one roller will include a corrugation pattern. For example, in another embodiment, only rollers 90B and 90C may include corrugation patterns. In one example, each of the rollers 90A-90C may have the same diameter, although the rollers may have different diameters. In general, the corrugating mechanism 70 includes a downstream roller (that may or may not have a corrugating pattern, such as roller 70D) for moving the media 10 at a feed speed that is greater than a feed speed of the media produced by an upstream roller having a corrugating pattern on its exterior.

Referring back to FIGS. 4 and 5, the corrugating mechanism 70 also includes two heaters 100, 102 (broadly, a heating source) for heating the filter media 10 as it travels through the corrugating mechanism. The first heater 100 is located vertically between rollers 90A and 90B for heating the filter media 10 as it travels from roller 90A toward roller 90B. The heater 102 is located vertically between roller 90B and roller 90C for heating the filter media 10 as it travels around roller 90B and toward roller 90C. It is understood that the corrugating mechanism 70 may include more than two heaters or may include a single heater as the heating source. In another embodiment, one or more of the corrugating rollers 90A-90C may include a heater for heating the exterior of the corresponding roller, which in turn heats the filter media 10 as it travels over the corresponding roller. In one embodiment, the heaters 100, 102 are suitable for heating the filter media 10 within a suitable elastic temperature range that softens the media substrate 12 (i.e., the media substrate becomes elastic and pliable) to allow the media substrate to readily deform (i.e., strain) when a force (i.e., stress) is applied thereto, but does not substantially affect the three-dimensional integrity of the nanofiber layer 12 (if present). The suitable temperature range is dependent on, among other things, the material of the filter media 10 and the feed speed of the filter material moving through the corrugating mechanism 70. In the illustrated embodiment, a temperature sensor 92 (e.g., an IR sensor) detects the temperature of the filter media 10 at the second corrugating roller 90B for use in a feedback loop. The corrugating mechanism 70 may include additional temperature sensors 92 for detecting the temperature of the filter media 10 for use in a feedback loop or the temperature sensors may be omitted. Other ways of heating the filter media 10 as it travels through the corrugating mechanism 70 do not depart from the scope of the present disclosure.

In the non-limiting illustrated embodiment, each of the corrugating rollers 90A-90D is rotatably driven, and the rollers are drive at different rotational speeds. In particular, the roller 90D that is downstream in the feed direction FD relative to the other rollers 90A-90C is driven at a greater rotational speed than the other rollers, and the other rollers are driven at rotational speeds that decrease in the upstream direction. Thus, the roller 90C is driven at a rotational speed greater than rollers 90A and 90B, but less than roller 90D; roller 90B is driven at a rotational speed greater than roller 90A; and roller 90A is driven at the lowest rotational speed. The rotational speed differential between the corrugating rollers 90A-90D imparts a feed speed gradient along the filter media 10 from the roller 90D to the roller 90C, and from the roller 90C to the roller 90B, and from the roller 90B to the roller 90A. This feed speed gradient increases tension on the filter media 10 on the upstream rollers 90A-90C, which imparts a radially inward force on the media 10 as the media advances over the upstream rollers 90A-90C. As a result of this force, the filter media 10 has softened and been rendered more elastic due to being heated by the heaters 100, 102, the filter media deforms and enters the channels 94 of the corrugating pattern on the upstream rollers 90B, 90C, such that the filter media deforms from a flat profile shape to the profile shape of the corrugating pattern. The media 10 may also undergo some deformation on the upstream roller 90A, but it is not believed that the deformation will be as significant as that imparted by rollers 90B and 90C due to the fact that the media is at a higher temperature (in a softening or elastic temperature range) as it moves over the rollers 90B, 90C.

In general, the degree to which the filter media 10 deforms to take on the profile shape of the corrugating pattern on the upstream roller(s) 90B is a function of the amount of tension, and therefore radially inward force, imparted on the filter media at the rollers 90B, 90C after the media has been heated by the heaters 100, 102. The more tension that is applied to the filter media 10 at the rollers 90B, 90C, in particular, the more the filter media deforms into the channels 94 of the corrugating pattern. In particular, it is believed that when a relatively low tension is applied to the filter media 10, the filter media only partially enters the channels, but does create grooves 56 having effective depths D1 generally equal to the depths of the channels 94. However, when a relatively high tension is applied to the filter media 10, the filter media completely enters the channels 94 to create grooves 56 having effective depths D1 generally equal to the depths D2 of the channels. The amount of tension imparted on the filter media 10 at the upstream rollers 90B, 90C is primarily a function of the speed differential between the rollers 90C and 90B, and the speed differential between the rollers 90D and 90C, respectively.

Referring to FIG. 5, in one embodiment each of the corrugating rollers 90A-90D includes a dedicated motor 110A-110D, such as a variable-frequency driven electric motor, for imparting rotation to the rollers at different rotational speeds. In the illustrated embodiment, a controller 120 (i.e., a processor and a memory including software) is in communication with the motors 110A-110D for controlling the speeds of the motors, and with the heaters 100, 102 and the heat sensor 92 for controlling the heat output of the heaters. Although not shown, the corrugating mechanism 70 may also include rotational speed sensors in communication with the controller for measuring the rotational speeds of the respective rollers 90A-90D. The controller 120 may be programmed to maintain each of the motors 110A-110D at a desired speed based on parameters stored within the memory of the controller. Alternatively, a user interface 122 (e.g., a touchscreen or other interface) may be in communication with the controller 120 for allowing a user to input the operating parameters to be used by the controller. For example, using the user interface 122 the user may be able to input the desired resulting effective depths D1 of the grooves 56 between adjacent corrugations 52 formed in the filter media 10, and the controller 120 may be programmed to automatically adjust operating parameters, such as the speed differential between the rollers 90A-90D and/or the heat produced by the heater 100, 102, based on the user's inputs. In this way, the shape of the corrugations, in particular the effective depths D1 of the grooves 56 between adjacent corrugations 52, is selectively adjustable when using the corrugation apparatus 50 to form corrugations in the filter media 10. Moreover, the user may change the operating parameters based on the type of media that is being used.

Other ways of providing speed differential between the corrugating rollers 90A-90D do not depart from the scope of the present disclosure. For example, the corrugating rollers 90A-90D may be driven by a single motor. In such an embodiment, the rollers 90A-90D may be operatively connected to the motor by a speed-reduction transmission mechanism, so that the rotational speeds of the rollers decrease toward the upstream of the feed direction FD. For example, the speed-reduction transmission may include a system of belts and pulleys.

In the illustrated embodiment, the filter media 10 cools after as it is fed from the corrugating roller 90C toward the corrugating roller 90D. In effect, the filter media 10 (e.g., the substrate 12) may cool to a temperature below its elastic temperature range to substantially thermally set the corrugations. Although not illustrated, the corrugating mechanism 70 may further include a cooling system for cooling the filter media 10 after the corrugations have been formed. For example, a fan or other cooling system may actively cool the media 10 as it moves from the corrugating roller 90C toward the corrugating roller 90D and/or as the media moves from the corrugating mechanism 70 toward the receiving mechanism 74.

As shown in FIGS. 4 and 5, the receiving mechanism 74 includes a receiving roller 130 (e.g., a flat roller) downstream of the corrugating roller 90D, and a receiving pan or area 132 for receiving the corrugated media 10 from the receiving roller. The receiving roller 130 may be a variable tension roller in communication with the controller 120. The receiving roller 130 may sense tension in the media, and this sensed tension is communicated to the controller 120. Using the data from the receiving roller 130, the controller 120 may adjust the speed of one or more of the motors 110A-110D to obtain the desired tension in the media 10. The receiving mechanism 74 may include a cooling system (e.g., a fan) (not shown) for cooling the media to a temperature below its elastic temperature to thermally set the corrugations 52.

One embodiment of a method of corrugating filter media will now be described with reference to FIG. 4. Using the apparatus 64 of the illustrated embodiment, the sheet S of filter media 10 is pulled through the corrugating mechanism 70 using the corrugating rollers 90A-90D. At the first corrugating roller 90A, the media 10 is below its elastic temperature range, and therefore, partial corrugations 52 may be formed in the media, but it is envisioned that the media will not completely enter the channels 94 on the roller. As the filter media 10 moves toward the second corrugating roller 90B, the heater 100 elevates the temperature of the media so that the media (e.g., the substrate 12) is within its elastic temperature range. While the media 10 is still within its elastic temperature range, it engages and is moved around the second roller 90B. At the second roller 90B, the media 10 enters the channels 94 at greater depths than at the first roller 90A. Any corrugations 48 that were formed by the first roller 90 A enter the corresponding aligned channel of the second roller 90B. Thus, the media 10 may already have some corrugations that more easily enter the channels 94 on the second roller 90B. The filter media 10 moves around the second roller 90B toward the third roller 90C while being heated by the second heater 102. In one example, the second heater 102 heats the filter media 10 to a second elevated temperature that is less than the temperature of the media when heated by the first heater 100. The second elevated temperature may be within the elastic temperature range of the media 10 (e.g., the substrate) but at a lower end of the range, or may be slightly below the elastic temperature range. The media 10 engages the third roller 90C and the corrugations 52 formed by the second roller 90B enter the corresponding aligned channels 94 on the third roller 90C. At the third roller 90C, the media 10 may enter the channels 94 at greater depths than at the second roller 90B. The media 10 cools as it moves around the third roller 90C toward the fourth roller 90D. Either before or after engaging the fourth roller 90D, the media cools to below its elastic temperature range to thermally set the corrugations 52. The thermally-set media 10 is then transported to the receiving mechanism 74.

In another embodiment of a method of corrugating filter media, less than four corrugating rollers may be used. In such an embodiment, the sheet S of filter media 10 is transported or moved along the feed direction FD using at least an upstream roller, such as roller 90C, having a corrugating pattern defining the circumferential channels 94, and downstream roller, such as roller 90D. The following method will be described in relation to these two rollers 90C, 90D. The upstream roller 90C is rotated, such as by motor 110C, at a first rotational speed to move the filter media 10 at the upstream roller at a first feed speed, and the downstream roller 90D is rotated, such as by motor 110D, at a second rotational speed, greater than the first rotational speed, to move the filter media at the downstream roller at a second feed speed that is greater than the first feed speed. The speed differential between the upstream and downstream rollers 90C, 90D, respectively, creates a speed gradient in the media 10 between the rollers. In turn, the speed gradient imparts a tensile force on the media 10, particularly at the upstream roller 90C. The filter media 10 is heated so that the filter media is within its elastic temperature range when the filter media engages the upstream roller 90C. The filter media at least partially enters the channels 94 of the corrugating pattern on the upstream roller 90C as the filter media engages the upstream roller to form the corrugations 52. The filter media 10 cools as it moves past the upstream roller 90C, toward the downstream roller 90D. In one embodiment, the filter media 10 cools to below its elastic temperature range to thermally set the corrugations 52 before the media engages the downstream roller 90D. In one example, the process is controlled by the controller 120 to ensure that the applied heat and the speed of the filter media 10 are within the operating parameters for forming the desired corrugations.

Figure 10:
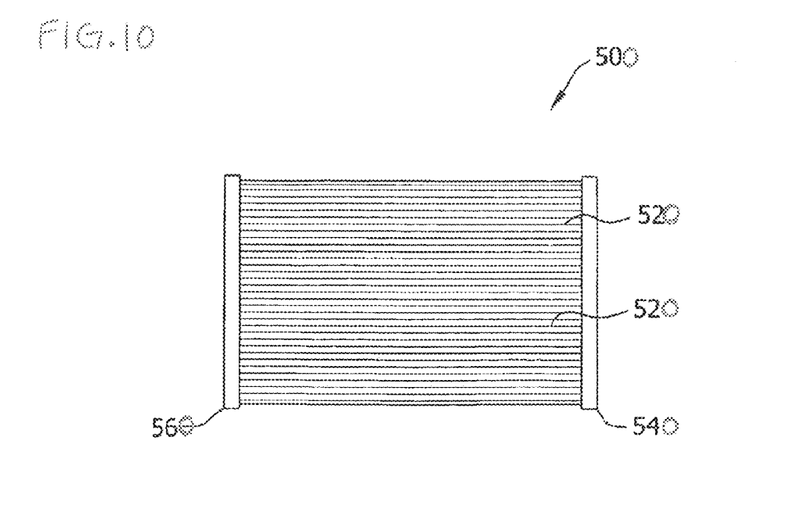
FIG. 10 is an embodiment of a filter element or cartridge including the corrugated filter media corrugated using the method and apparatus of the present disclosure.
Figure 11:
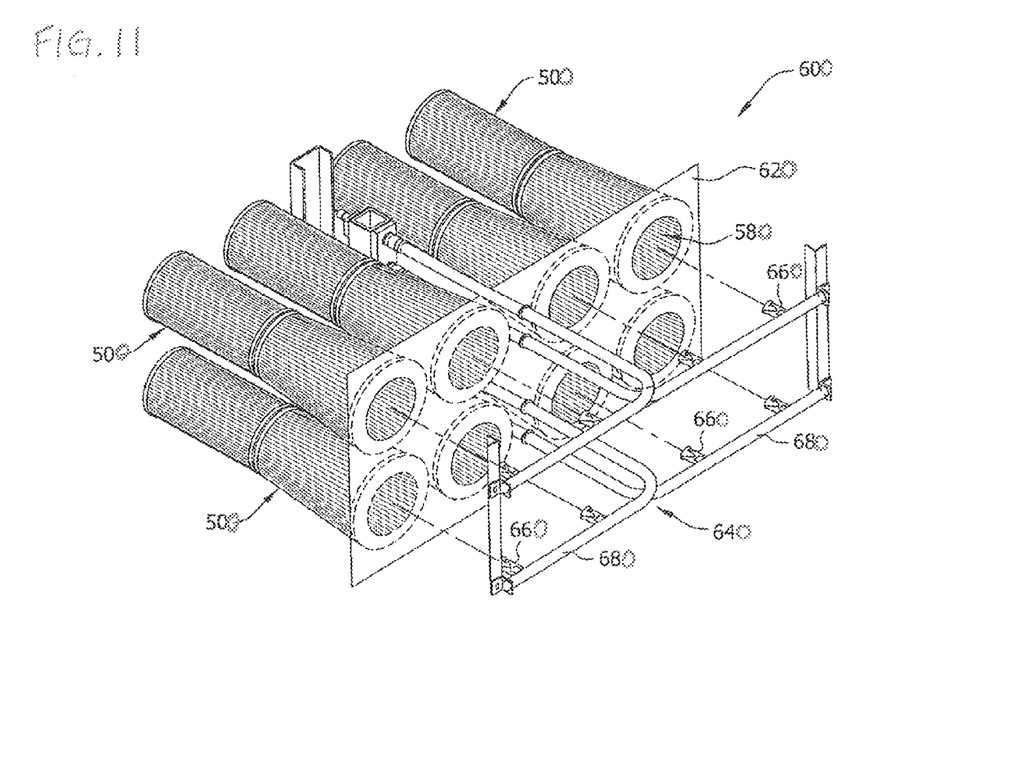
FIG. 11 is a perspective of a filter assembly that includes the filter element shown in FIG. 10.

Referring to FIGS. 10 and 11, in one example the corrugated filter media 10 may be used in a filter element 500 for use in filtering air in an air intake house of a gas turbine system. Filter element 500 includes a first end cap 540, an opposing second end cap 560, and a hollow corrugated filter media 10 extending between the end caps 540 and 560. The filter element 500 has a tubular shape defining an interior conduit 580 (shown in FIG. 11). The filter element 500 is cylindrical in shape, but it can also be conical as shown in FIG. 11. The filter element 500 can also include an inner and/or an outer support liner to provide structural integrity to the filter element and/or support for the filter media 10.

FIG. 11 is a perspective illustration of a filter assembly 600 that includes a plurality of the filter elements 500 mounted on a tube sheet 620, the filter elements are arranged in pairs in an end to end relationship. The tube sheet 620 separates the dirty air side from the clean air side of the filter assembly 600. A cleaning system 640 for cleaning the filter elements 500 with pulsed air includes a plurality of air nozzles 660 mounted to air supply pipes 680. Pulses of compressed air directed into interior conduits 580 of the filter elements 500 are used to clean the filter elements of collected dirt and dust.

EXAMPLE

Figure 8:
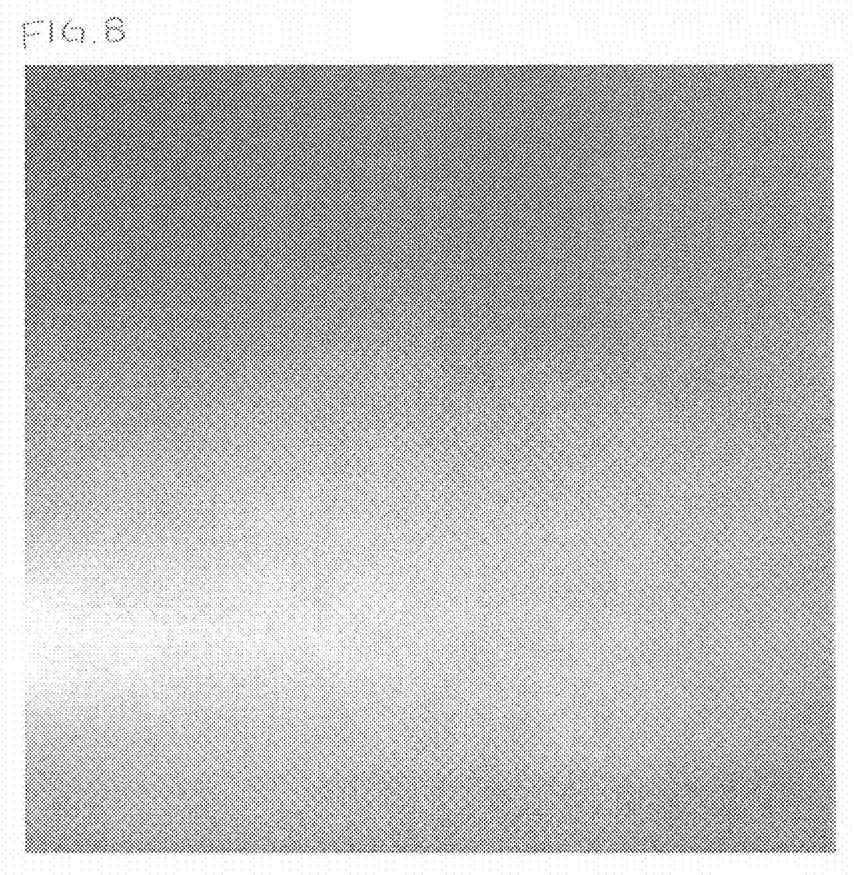
FIG. 8 is a photo of flat filter media before corrugation using the method and apparatus of an example presented in the present disclosure.
Figure 9:
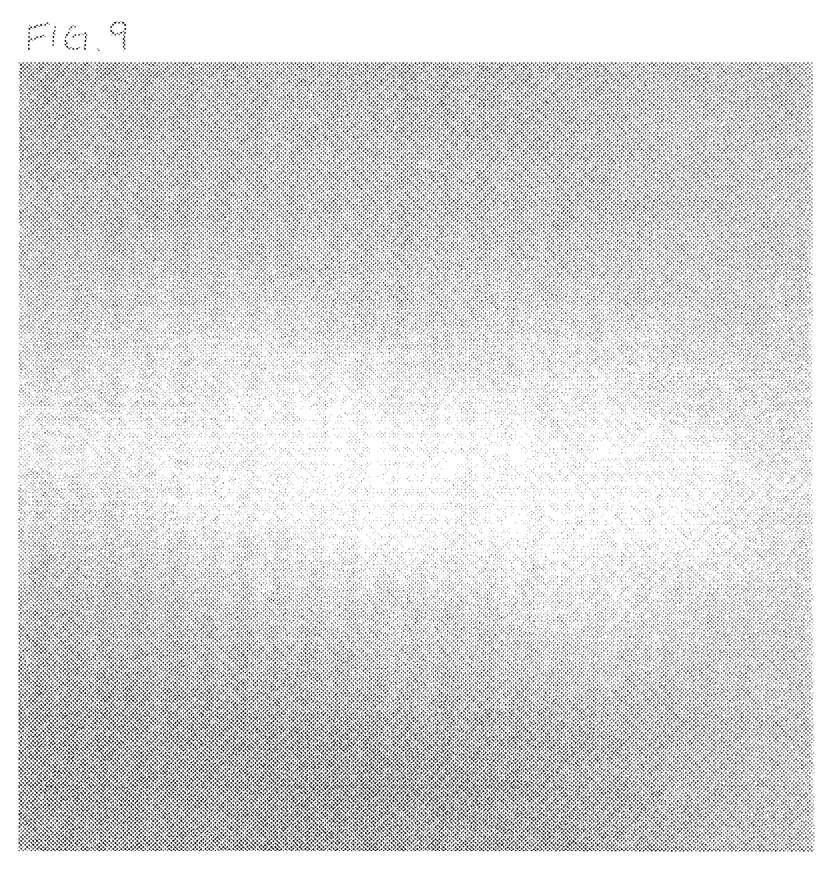
FIG. 9 is a photo of corrugated filter media that was corrugated using the method and apparatus of the example presented in the present disclosure.

An example of a method for corrugating filter media will not be disclosed. In this example, the corrugating apparatus used was the corrugating apparatus shown in FIGS. 4 and 5 and described above. The filter media used was product no. POA75V3VA, commercially available from FINETEX TECHNOLOGY (Cavite, Philippines), which is disclosed above and in Table 1. The parameters of the apparatus that were used are set forth in Table 2, below. FIG. 8 is a photo of the media before corrugation, and FIG. 9 is a photo of media after corrugation.

TABLE 2

Parameters for Corrugating Apparatus

| Operating Parameters | |
|---|---|
| Heater 100 Temp (F.) | 100 F.-250 F. |
| Heater 102 Temp (F.) | 100 F.-250 F. |
| Roller 90D Speed (rev/min) | 25-160 |
| Roller 90C Speed (rev/min) | 25-160 |
| Roller 90B Speed (rev/min) | 25-160 |
| Roller 90A Speed (rev/min) | 25-160 |
| Dimensional Parameters | |
| Vertical Distance between Upper and Lower Corrugating Rollers | 40" (1016 mm) |
| Horizontal Distance between Adjacent Corrugating Rollers | Top: 11.37" (289 mm) Bottom: 8.00" (203 mm) |
| Diameters of Corrugating Rollers | 4.00 in (102 mm) |
| Depths of Channels of Corrugating Rollers | .125 in (3.2 mm)-.250 in (6.35 mm) |

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of corrugating filter media, the method comprising:

transporting a sheet of filter media along a feed path in a feed direction using an upstream roller and a downstream roller, wherein exterior surfaces of the respective upstream and downstream rollers engage the sheet of filter media during said transporting, wherein the exterior surface of at least the upstream roller has a corrugating pattern defining circumferential channels, wherein at least the upstream roller is free from association with another roller such that at an instantaneous time during said transporting, an upstream portion of the sheet of filter media that is engaging the upstream roller is free from engagement with another roller;

rotating the upstream roller at a first rotational speed to move the filter media at the upstream roller at a first feed speed;

rotating the downstream roller at a second rotational speed to move the filter media at the downstream roller at a second feed speed that is greater than the first feed speed;

heating the filter media so that the upstream portion of the sheet of filter media is within its elastic temperature range when the upstream portion of the sheet of filter media engages the upstream roller; and drawing the heated upstream portion of the sheet of filter media engaging the upstream roller at least partially into the circumferential channels of the corrugating pattern on the upstream roller as the upstream portion of the sheet of filter media engages the upstream roller, wherein during said drawing, the entire upstream portion engaging the upstream roller and entering, at least partially, the circumferential channels of the corrugating pattern is free from engagement with another roller.

2. The method of corrugating filter media set forth in claim 1, wherein the sheet of filter media comprises a nonwoven fabric layer.

3. The method of corrugating filter media set forth in claim 2, wherein the nonwoven fabric layer constitutes a base media substrate, the sheet of filter media further comprising a nanofiber layer deposited on at least a first side of the nonwoven fabric layer.

4. The method of corrugating filter media set forth in claim 3, wherein the nonwoven fabric layer comprises a thermoplastic polymer.

5. The method of corrugating filter media set forth in claim 3, wherein the nonwoven fabric layer comprises a thermosetting polymer.

6. The method of corrugating filter media set forth in claim 2, wherein the nonwoven fabric layer comprises bicomponent fibers having core-sheath structures, wherein sheaths of the core-sheath structures have lower melting temperatures than cores of the bicomponent fibers.

7. The method of corrugating filter media set forth in claim 1, further comprising detecting the temperature of the filter media at the upstream roller using a temperature sensor.

8. The method of corrugating filter media set forth in claim 7, further comprising:

receiving temperature signals, using a controller, from the temperature sensor detecting the temperature of the filter media at the upstream roller; and controlling an output of a heater, based on the received temperature signals, using the controller to heat the filter media within its elastic temperature range when the filter media engages the upstream roller.

9. The method of corrugating filter media set forth in claim 7, further comprising detecting the rotational speeds of the upstream and downstream rollers using at least one rotational speed detector.

10. The method of corrugating filter media set forth in claim 9, further comprising:

receiving rotational speed signals, using a controller, from the rotational speed sensor detecting the rotational speeds of the upstream and downstream rollers; and controlling an output of at least one motor driving the upstream and downstream rollers, based on the received rotational speed signals, using the controller to drive rotation of the upstream and downstream rollers at the respective first and second rotational speeds.

11. The method of corrugating filter media set forth in claim 1, further comprising:

transporting the sheet of filter media along the feed path in the feed direction using a second downstream roller, wherein an exterior surface of the second downstream rollers engages the sheet of filter media during said transporting, wherein the exterior surface of the second downstream roller has a corrugating pattern defining circumferential channels, wherein at least the second downstream roller is free from association with another roller such that at an instantaneous time during said transporting, a downstream portion of the sheet of filter media that is engaging the second downstream roller is free from engagement with another roller;

rotating the second downstream roller at a third rotational speed to move the filter media at the second downstream roller at a third feed speed that is greater than the first and second feed speeds;

heating the filter media so that the filter media is within its elastic temperature range when the filter media engages the second downstream roller; and drawing the portion heated filter media engaging the second downstream roller at least partially into the circumferential channels of the corrugating pattern on the second downstream roller as the portion of filter media engages the second downstream roller, wherein during said drawing, the entire downstream portion engaging the second downstream roller and entering, at least partially, the circumferential channels of the corrugating pattern of the second downstream roller is free from engagement with another roller.

12. The method of corrugating filter media set forth in claim 1, further comprising cooling the filter media, after said heating the filter media so that the filter media is within its elastic temperature range when the filter media engages the upstream roller, to a temperature below its elastic temperature range to thermally set a corrugation pattern formed on the filter media.

* * * * *